(12) United States Patent
Tanaka et al.

(10) Patent No.: US 7,707,908 B2
(45) Date of Patent: May 4, 2010

(54) STEERING UNIT SUPPORT DEVICE FOR A VEHICLE

(75) Inventors: Seiji Tanaka, Toyota (JP); Toshifumi Oheda, Toyota (JP); Hideaki Okamoto, Okazaki (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 1123 days.

(21) Appl. No.: 11/144,600

(22) Filed: Jun. 6, 2005

(65) Prior Publication Data

US 2006/0000307 A1 Jan. 5, 2006

(30) Foreign Application Priority Data

Jun. 16, 2004 (JP) ............... 2004-178715

(51) Int. Cl.
*B62D 1/18* (2006.01)
*B62D 1/00* (2006.01)
(52) U.S. Cl. ......................... 74/493; 280/777
(58) Field of Classification Search .................. 74/493, 74/495; 280/777; 180/232; 403/2
See application file for complete search history.

(56) References Cited

U.S. PATENT DOCUMENTS

| | | | | | |
|---|---|---|---|---|---|
| 3,415,140 | A | * | 12/1968 | Bien et al. ................... | 74/492 |
| 4,241,937 | A | * | 12/1980 | Eggen et al. ................. | 280/777 |
| 4,452,096 | A | * | 6/1984 | Workman ..................... | 74/492 |
| 5,730,465 | A | * | 3/1998 | Barton et al. ................ | 280/775 |
| 6,170,873 | B1 | * | 1/2001 | Jurik et al. .................. | 280/777 |
| 6,467,807 | B2 | * | 10/2002 | Ikeda et al. .................. | 280/775 |
| 7,051,612 | B2 | * | 5/2006 | Green et al. .................. | 74/493 |
| 2003/0000330 | A1 | * | 1/2003 | Murakami et al. ............ | 74/492 |
| 2005/0104353 | A1 | * | 5/2005 | Ikeda et al. ................. | 280/775 |

FOREIGN PATENT DOCUMENTS

JP 2001-315649 A 11/2001

\* cited by examiner

*Primary Examiner*—Thomas R Hannon
*Assistant Examiner*—Justin Krause
(74) *Attorney, Agent, or Firm*—Birch, Stewart, Kolasch & Birch, LLP (57) ABSTRACT

A steering column is attached to a fixing bracket of a vehicle body through a support bracket such that the steering column is inclined with respect to a vertical plane perpendicular to the width direction of the vehicle body. A guide plate is attached to one of both side portions of the fixing bracket. The one side portion is located on the side toward which the rear portion of the steering column is inclined. When the support bracket moves due to external force acting thereon, the guide plate restricts movement of the support bracket in the width direction of the vehicle body to permit the steering column to move toward the front of the vehicle body while at the same time suppressing swaying motion of the steering column, thereby stabilizing the load at the time of absorption of impact.

11 Claims, 8 Drawing Sheets

STEERING UNIT SUPPORT DEVICE FOR A VEHICLE

BACKGROUND OF THE INVENTION

1. Field of the Invention

The present invention relates to a steering unit support device for a vehicle.

2. Description of the Related Art

A steering unit of a vehicle is constructed to transmit rotation of a steering wheel to front wheels through a steering shaft, a universal joint, a steering gear mechanism, a steering knuckle, etc. such that the front wheels are directed at an intended steering angle. The steering shaft extends through a steering column concentrically therewith and is rotatably supported thereby, and the steering column is supported on the vehicle body by means of a fixing bracket fixed to a cross member of the vehicle body. The steering unit is equipped with a mechanism for absorbing load produced at the time of collision of the vehicle, as well as a mechanism for absorbing load produced at the time of secondary collision of the steering unit with the driver after the collision.

The steering column is associated with a support device which, in case of collision of the vehicle, allows the steering shaft to be detached from the fixing bracket toward the front of the vehicle body by the load input from the steering wheel side at the time of collision. To stabilize the movement of the steering shaft toward the front of the vehicle body, the support device disclosed in Unexamined Japanese Patent Publication No. 2001-315649 has a direction controlling member provided on a bracket attached to the front side of the vehicle body. In this support device, the direction controlling member restricts lateral and vertical swaying motion of the steering shaft, and in addition, an energy (impact load) absorbing structure so tuned as to produce required load is provided at the mounting section on the front side of the vehicle body.

SUMMARY OF THE INVENTION

An aspect of the present invention is a steering unit support device for a vehicle, comprising: a fixing bracket fixed to a cross member of a body of the vehicle; a steering column inclined with respect to a vertical plane perpendicular to a width direction of the vehicle body; a steering shaft rotatably supported by the steering column and connected to a steering wheel of the vehicle; a support bracket supporting the steering column and attached to the fixing bracket; and a guide plate attached to one of both side portions of the fixing bracket, the one side portion of the fixing bracket being located on a side toward which a rear portion of the steering column is inclined and the guide plate being adapted to restrict movement of the support bracket in the width direction of the vehicle body when the support bracket moves due to external force acting thereon.

BRIEF DESCRIPTION OF THE DRAWINGS

The present invention will become more fully understood from the detailed description given hereinafter and the accompanying drawings which are given by way of illustration only, and thus, are not limitative of the present invention, and wherein.

DETAILED DESCRIPTION OF THE INVENTION

An embodiment of the present invention will be hereinafter described in detail with reference to the accompanying drawings.

Figure 1:
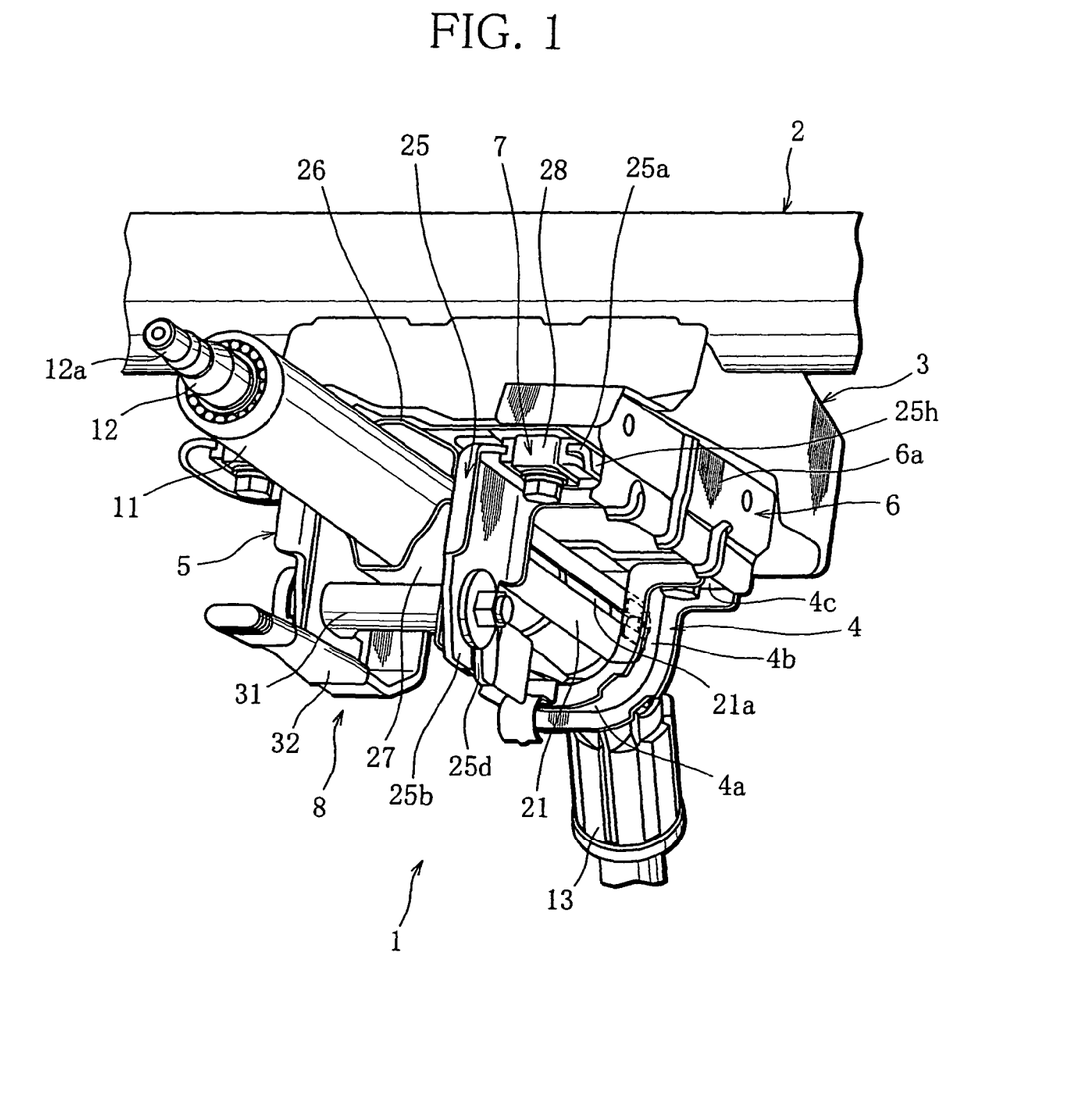
FIG. 1 shows a perspective view of a principal part of steering unit to which a steering unit support device of the present invention is applied.
Figure 2:
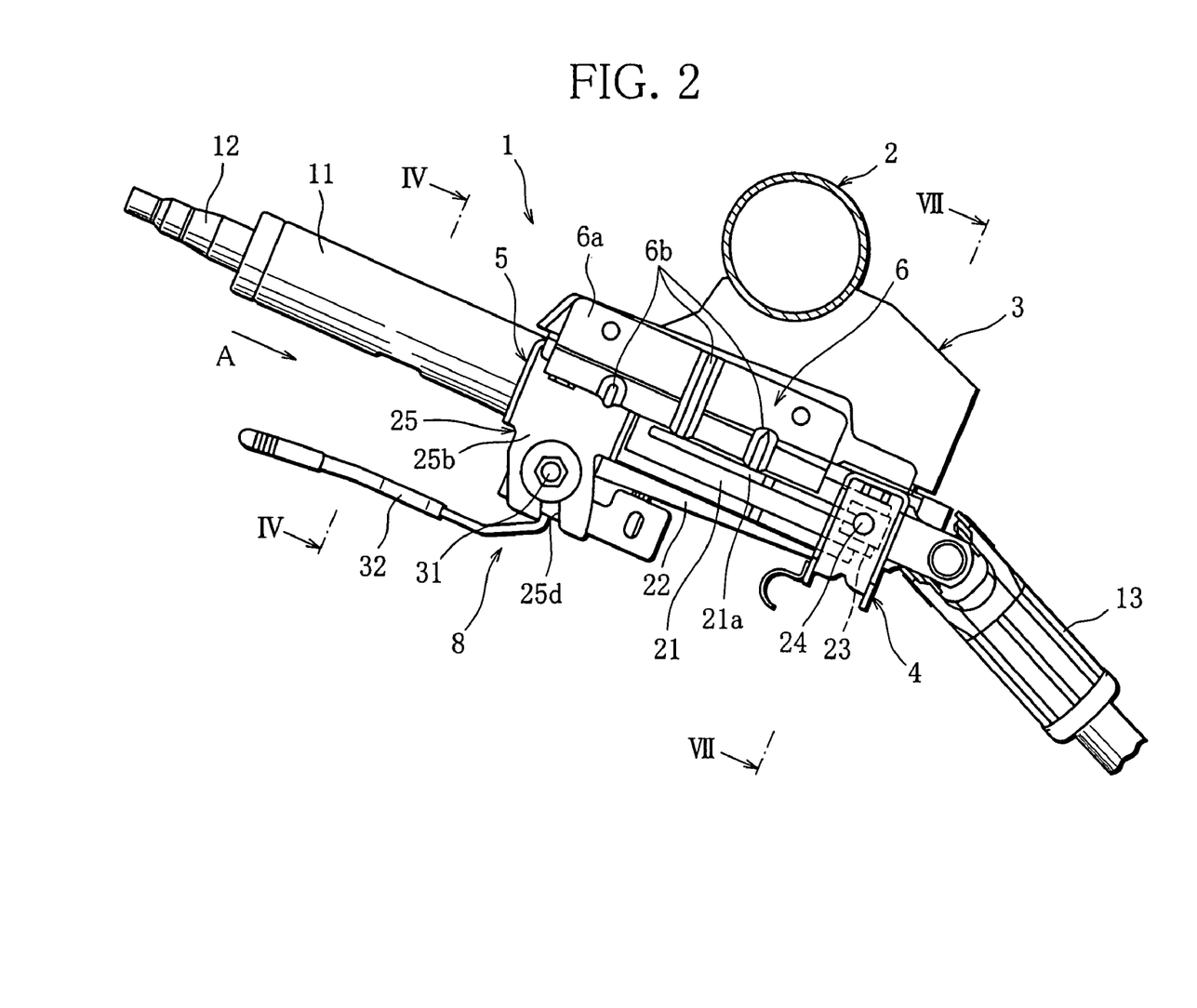
FIG. 2 shows a side view of the steering unit shown in FIG. 1.
Figure 3:
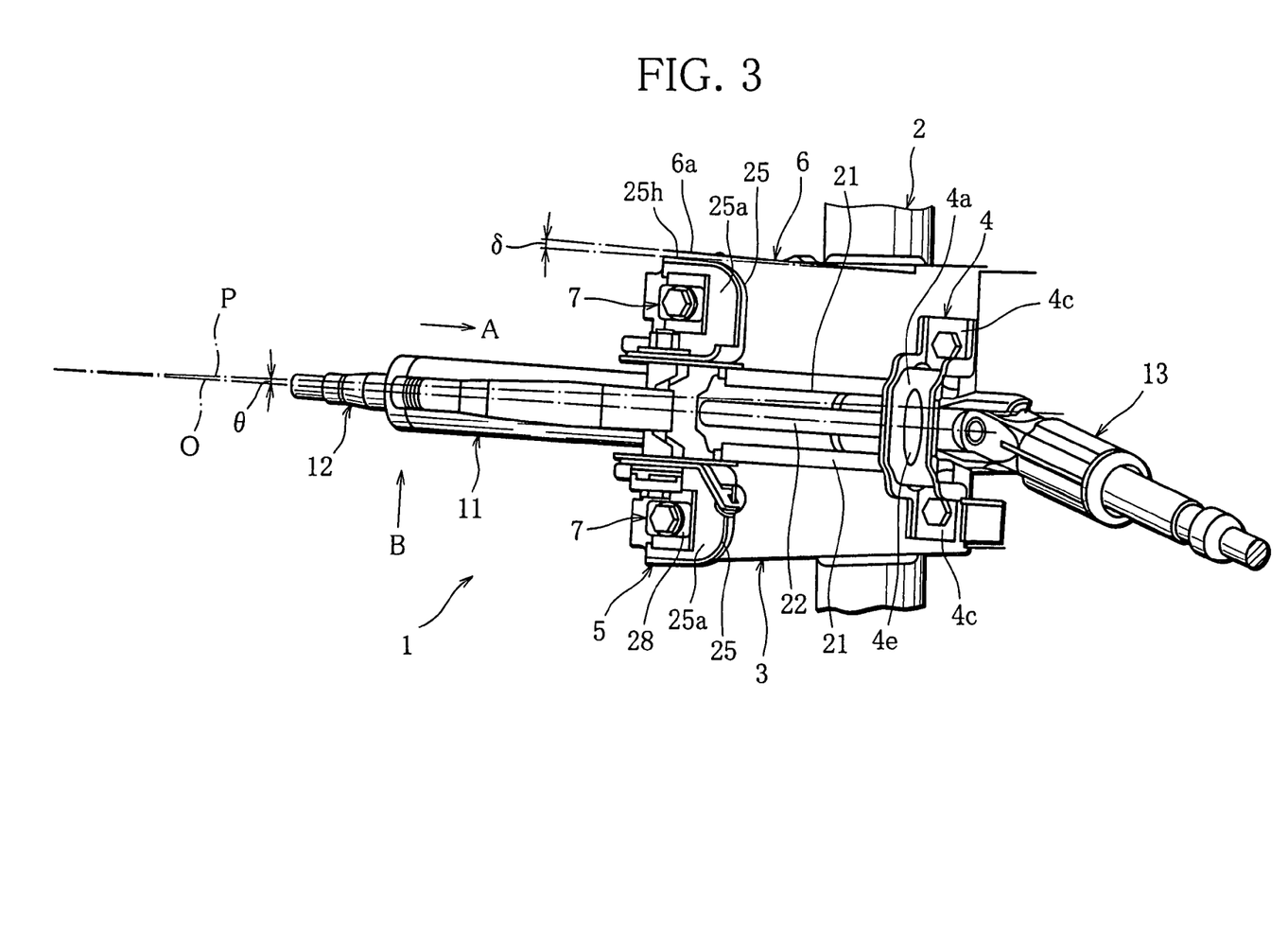
FIG. 3 shows a bottom view of the steering unit shown in FIG. 1.

As shown in FIGS. 1 to 3, a steering unit 1 is supported by a lower portion of a fixing bracket 3 through a front support bracket 4 and a rear support bracket 5. The fixing bracket 3 is fixed to a lower portion of a cross member 2, which is arranged on the front side of a vehicle and extends in the width direction of the vehicle. A guide plate 6 for guiding the rear support bracket 5 is attached to that edge portion of the fixing bracket 3 which is located on the outer side of the vehicle body. In the steering unit 1 shown in FIGS. 1 to 3, the right side corresponds to the front side of the vehicle body and the left side corresponds to the rear side (driver's seat side) of same.

The steering unit 1 is constituted by a steering column 11, a steering shaft 12 rotatably received in the steering column 11 and supported thereby, a steering wheel (not shown) fixed to the rear end 12a of the steering shaft 12, a universal joint 13 coupled to the front end of the steering shaft 12, a steering gear mechanism (not shown) coupled to the front end of the universal joint 13, a steering knuckle (not shown) formed integrally with the front axle of the vehicle, etc. With the steering unit 1 constructed in this manner, rotation of the steering wheel is transmitted to front wheels attached to the steering knuckles.

The steering unit 1 is subject to restrictions imposed by the space in the vehicle body or the layout of other members. Accordingly, as shown in the bottom view of FIG. 3, the steering column 11 and the steering shaft 12 are inclined with respect to a vertical plane perpendicular to the width direction of the vehicle. Specifically, the steering unit 1 is mounted on the vehicle body such that the front portion thereof is directed inward of the vehicle body, thus forming an inclination angle θ between the center line O of both of the steering column 11 and the steering shaft 12 and a line P parallel to the longitudinal axis of the vehicle body.

Figure 7:
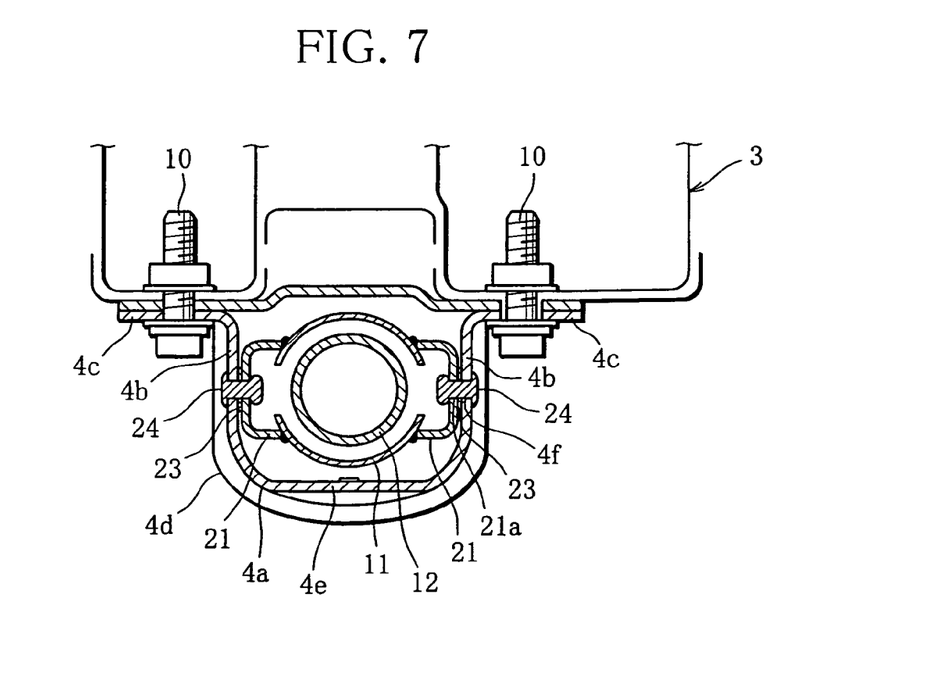
FIG. 7 shows a sectional view of the steering unit, taken along line VII-VII in FIG. 2.

The steering column 11 has a front end portion supported by a lower portion of the front end of the fixing bracket 3 through the front support bracket 4, and has an intermediate portion supported by a lower portion of the rear end of the fixing bracket 3 through the rear support bracket 5. The support bracket 4 is fixed to the fixing bracket 3 by bolts 10 (FIG. 7). The support bracket 5 is attached to the rear end of the fixing bracket 3 through a detachable mechanism 7 in a manner such that the bracket 5 is detachable from the bracket 3 in the frontward direction of the vehicle body. The steering column 11 is attached to the support bracket 5 through a tilt mechanism 8. Thus, the steering column 11 can be swung up and down through the tilt mechanism 8 about a fulcrum, that is, right and left rivets 24 (FIGS. 2 and 7) attached to the front end of the steering column, whereby the height of the steering wheel can be adjusted to a level desired by the driver.

As shown in FIGS. 1 to 4 and 7, two brackets 21 each having a generally U-shaped cross section are welded to both, right and left sides of the steering column 11, respectively. Each bracket 21 has a front end slightly projecting from the front end of the steering column 11 and has a rear portion extending along the steering column 11 up to a position near the support bracket 5. A longitudinal slit 21a extends from the vicinity of the front end of each bracket 21 to the vicinity of the rear end of same. These brackets 21 function as a direction controlling member for restricting lateral motion of the steering shaft 12 when the steering shaft moves toward the front of the vehicle body at the time of collision. Also, as shown in FIG. 2, a bracket 22 having a generally U-shaped cross section is attached to a lower surface of the steering column 11. The bracket 22 extends in the longitudinal direction of the steering column 11 from the vicinity of the front end of the steering column 11 up to a position near the support bracket 5, and has a height gradually increasing toward the rear end with distance from the front end thereof.

As seen from FIGS. 1 and 7, the front support bracket 4 has a generally U-shaped, downwardly convex central portion 4a and reinforcing flanges 4d protruding from front and rear edges, respectively, of the central portion 4a. The central portion 4a has side walls 4b whose upper ends are bent substantially at right angles on opposite sides, thus forming mounting sections 4c. The distance between the side walls 4b is slightly greater than an overall width of the members therein, that is, from one of the brackets 21 to the other, both attached to the respective sides of the steering column 11. The support bracket 4 has a depth slightly greater than the outside diameter of the steering column 11. Also, the central portion 4a has a protuberance 4e extending laterally and protruding inward (upward) at a location corresponding to the bracket 22 attached to the lower surface of the steering column 11. Pivot holes 4f are formed in the respective side walls 4b at locations corresponding to the respective slits 21a of the brackets 21.

The protuberance 4e (FIG. 7) and the bracket 22 (FIG. 2) attached to the steering column 11 constitute an energy absorption mechanism for absorbing energy transmitted to the steering column 11 and the steering shaft 12 at the time of collision.

Figure 8:
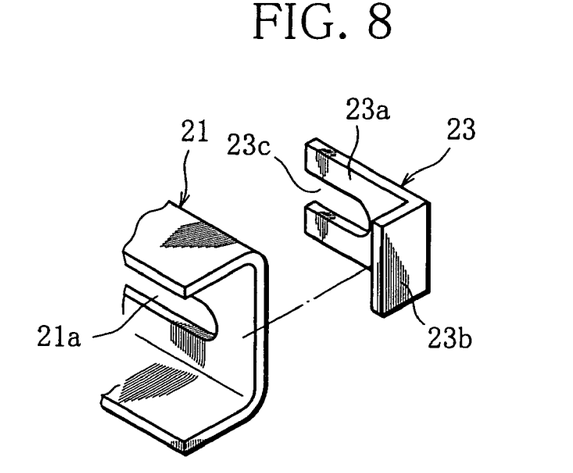
FIG. 8 shows a perspective view of a spacer appearing in FIG. 7.

The steering column 11 is supported at the right and left brackets 21 by the support bracket 4 with spacers 23 interposed therebetween. The width of the spacers 23 is slightly smaller than that of the brackets 21, as shown in FIG. 8. Each spacer 23 is an L-shaped member including a longitudinally elongate plate-like portion 23a serving as the spacer with a predetermined thickness and a front end portion 23b bent inward substantially at a right angle. The plate-like portion 23a has a slit 23c extending longitudinally from the vicinity of the front end and opening at the rear end thereof. The width of the slits 23c is equal to that of the slits 21a in the brackets 21.

Figure 9:
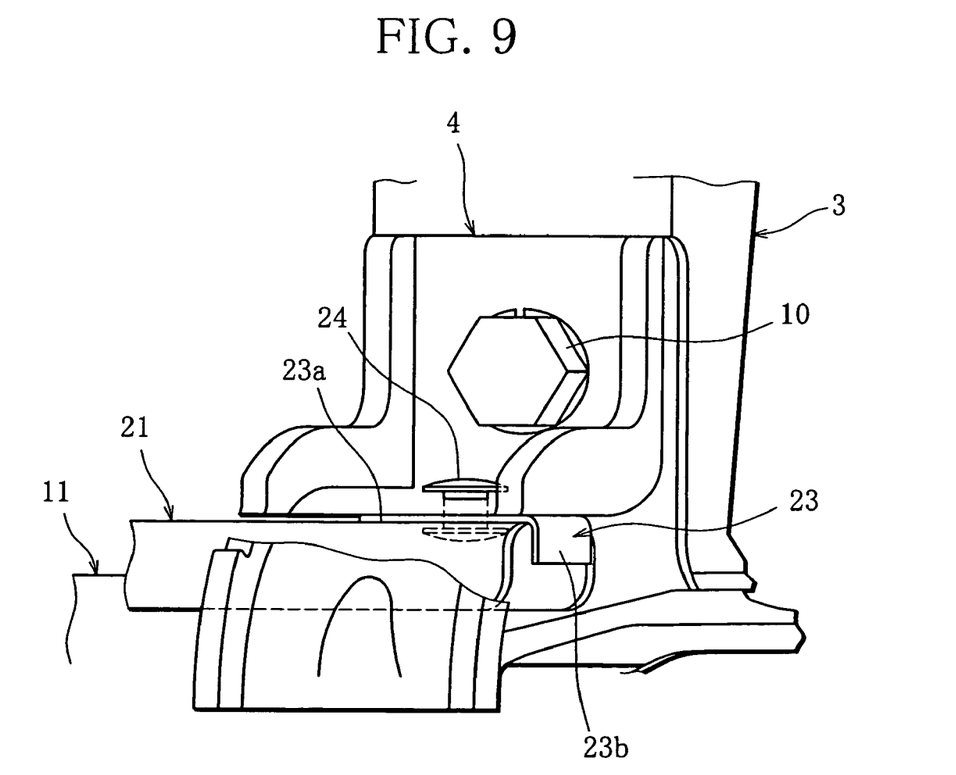
FIG. 9 shows a bottom view of a part of the steering unit shown in FIG. 7.

As shown in FIGS. 8 and 9, each spacer 23 is interposed between a corresponding one of the brackets 21 and the corresponding side wall 4b of the support bracket 4 in a manner such that the L-bent front end portion 23b is engaged with the front end of the bracket 21. Also, as seen from FIG. 7, the steering column 11 is supported by the support bracket 4 via the rivets 24 inserted through the pivot holes 4f of the support bracket 4, the slits 23c of the spacers 23 and the slits 21a of the brackets 21 in a manner such that the steering column 11 is vertically swingable and is also movable toward the front of the vehicle body. Thus, as shown in FIG. 2, the steering column 11 is supported at the front ends of the slits 21a of the brackets 21 by the support bracket 4 via the rivets 24 inserted through the respective slits 21a.

Normally, the spacers 23 serve to fill the gap between the individual brackets 21, as the lateral direction controlling member for the steering column 11, and the respective side walls 4b of the support bracket 4, thereby enhancing stiffness and eliminating excessive play. When the steering column 11 moves toward the front of the vehicle body, the spacers 23 engaged with the front ends of the respective brackets 21 move forward together with the steering column 11 and come off the support bracket 4, thereby creating a gap between the individual brackets 21 and the respective side walls 4b of the support bracket 4. The gaps created in this manner make it easy for the steering column 11 to move forward without being locked even if the steering column 11 sways laterally by an amount corresponding to the overall thickness of the spacers.

Figure 10:
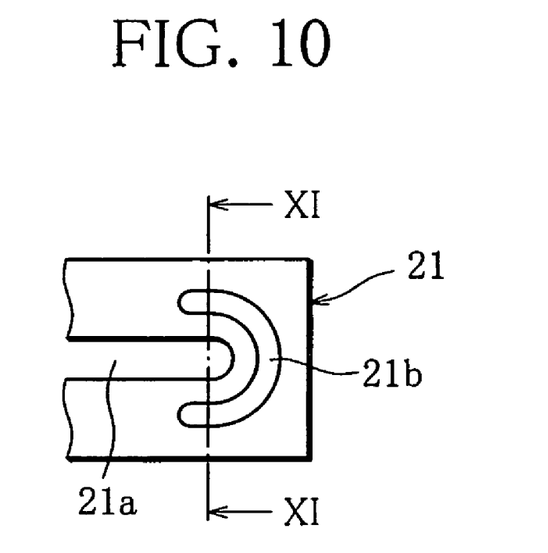
FIG. 10 shows a side view of a front portion of a bracket having a different shape from that shown in FIG. 8.
Figure 11:
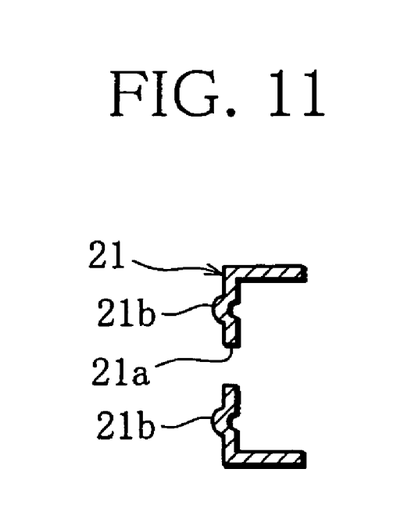
FIG. 11 shows a sectional view taken along line XI-XI in FIG. 10.

Instead of using the spacers 23, the front end portion of each bracket 21 may be pressed to form a semicircular ridge 21b as a spacer which is located in front of the slit 21a and protrudes outward, as shown in FIGS. 10 and 11. This makes it possible to reduce the number of parts and to facilitate assembling.

Figure 4:
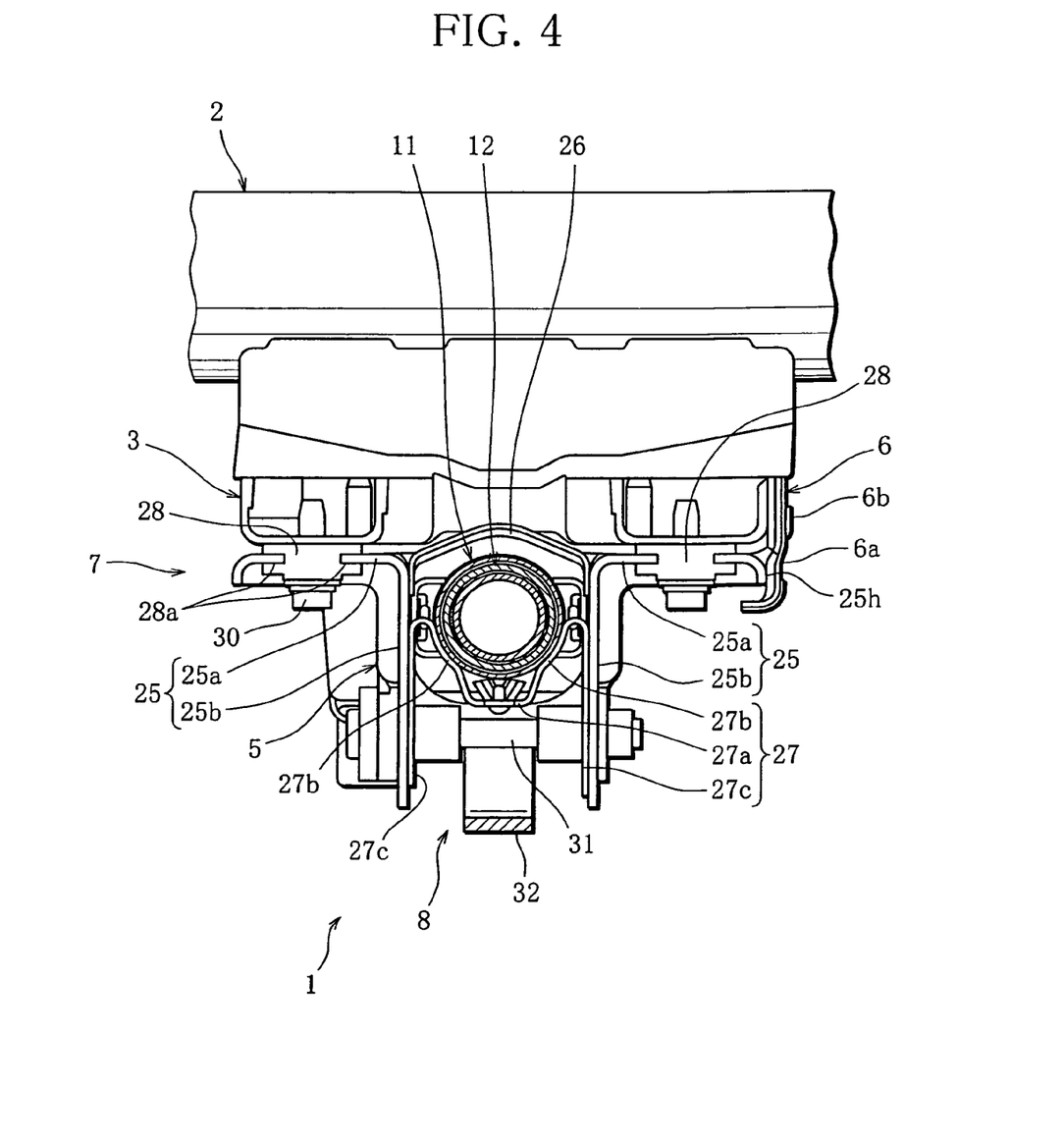
FIG. 4 shows a sectional view of the steering unit, taken along line IV-IV in FIG. 2.

As seen from FIGS. 1 and 4, the rear support bracket 5 is constituted by inverted L-shaped right and left brackets 25 arranged on both sides of the steering column 11, respectively, a support plate 26 straddling the steering column 11 and coupling the right and left brackets 25 to each other, and a support plate 27 fixedly supporting right and left lower sides of the steering column 11 and connected to the right and left brackets 25. The right and left brackets 25 each have a horizontal portion 25a which has a generally V-shaped notch 25c cut in a central portion of the rear edge thereof and opening rearward, as indicated by the broken lines in FIG. 5. Also, as shown in FIG. 2, a slit 25d opening downward is formed in a vertical portion 25b of each of the right and left brackets 25.

Figure 5:
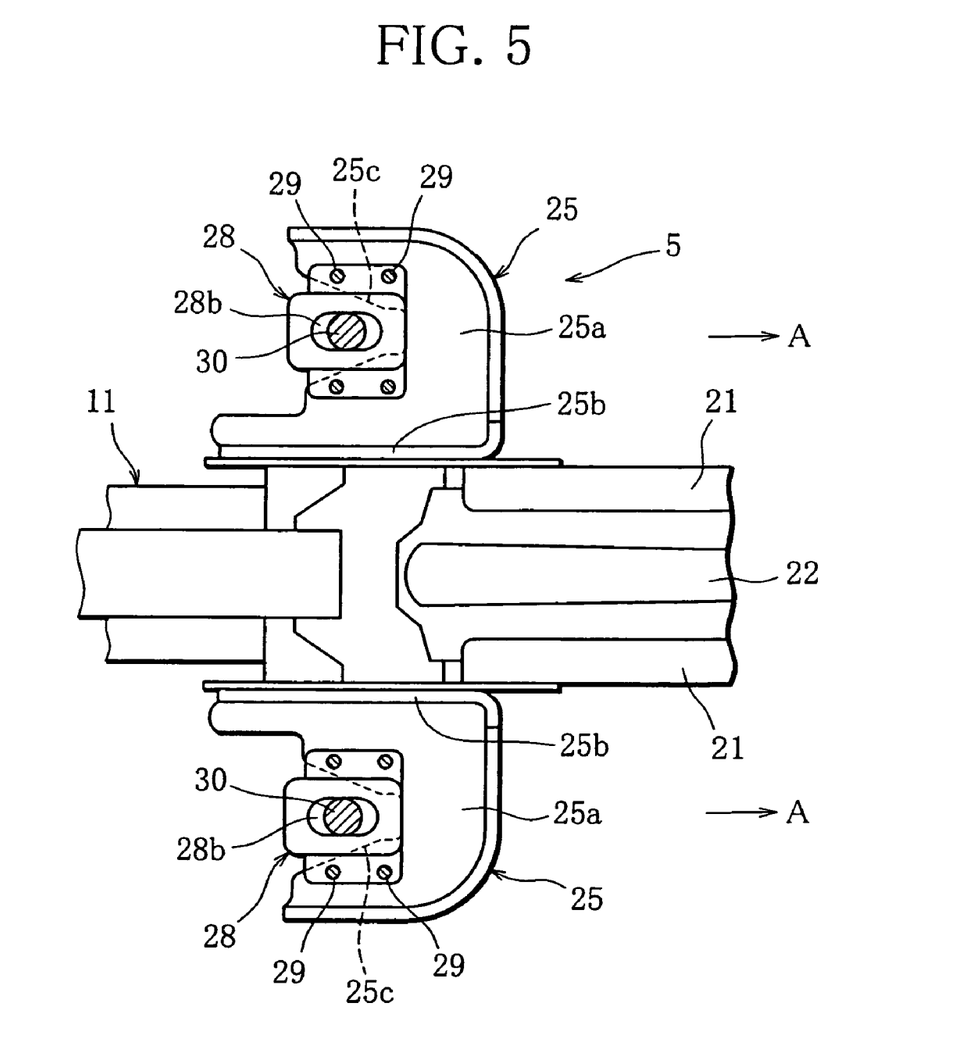
FIG. 5 shows a bottom view of a support bracket appearing in FIG. 4.

The notch 25c in the horizontal portion 25a of each bracket 25 is fitted with a capsule 28, as shown in FIG. 5. Slits 28a are formed in both, right and left side surfaces of the capsule 28, as shown in FIG. 4, and a longitudinally elongate hole 28b is formed in a central portion of the capsule 28, as shown in FIG. 5. The capsule 28 is fitted into the notch 25c of the corresponding horizontal portion 25a with its right and left slits 28a engaged with the edges defining the notch 25c such that the capsule is movable rearward relative to the horizontal portion 25a, and is fixed to the horizontal portion 25a by pins 29 made of an easily rupturable material such as resin. Each capsule 28 is fixed to the fixing bracket 3 by means of a bolt 30 inserted through the elongate hole 28b (FIGS. 4 and 5). The notches 25c, the capsules 28 and the pins 29 constitute the detachable mechanism 7 permitting the support bracket 5 to be detached from the fixing bracket 3.

As shown in FIG. 4, the support plate 27 is a generally M-shaped member having a central portion 27a slightly protruding downward, right and left upper portions 27b welded to the right and left lower surfaces of the steering column 11, respectively, and side walls 27c extending downward and disposed in close contact with the inner side surfaces of the respective vertical portions 25b of the right and left brackets 25. The side walls 27c are connected to each other by a horizontal support shaft 31 penetrating through lower portions thereof. The support shaft 31 is supported at opposite ends by the vertical portions 25b of the right and left brackets 25 in a manner such that the support shaft 31 is vertically movable (the steering column 11 can be titled) along the slits 25d (FIG. 2). A tilt handle 32 is attached to a central portion of the support shaft 31. The slits 25d, the support plate 26, the support shaft 31, the tilt handle 32 and their associated parts constitute the tilt mechanism 8 whereby the height of the steering wheel can be adjusted to a desired level matching the driver's posture.

The guide plate 6, which is generally L-shaped as viewed from one end thereof as shown in FIGS. 1 to 4, has a side wall 6a whose lower edge is bent slightly inward, and reinforcing ribs 6b formed at front, central and rear portions of the side wall 6a. The guide plate 6 is fixed at the upper portion of the side wall 6a to that side surface of the fixing bracket 3 toward which the rear portion of the steering column 11 is inclined, that is, to the side surface located on the outer side of the vehicle body. As shown in FIG. 2, the side wall 6a of the guide plate 6 extends in the longitudinal direction of the vehicle body from the vicinity of the rear end of the support bracket 4 to the vicinity of the rear end of the support bracket 5. The lower edge of the guide plate 6 is located at a level slightly lower than the horizontal portion 25a of the corresponding bracket 25, as shown in FIG. 4.

Figure 6:
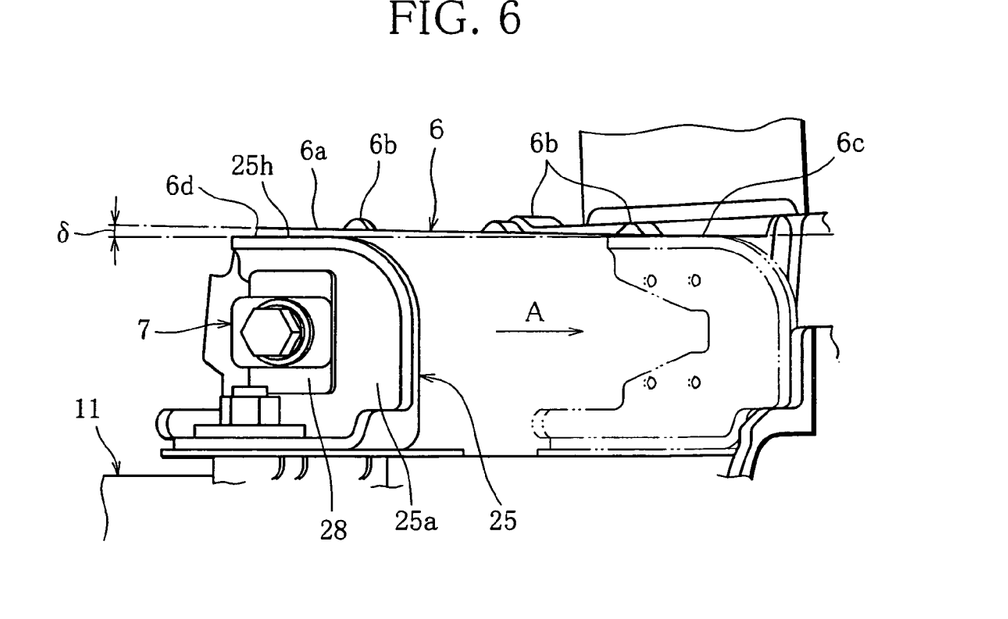
FIG. 6 shows the relationship between the support bracket and a guide plate appearing in FIG. 4.

The side wall 6a of the guide plate 6 is inclined so as to gradually approach the steering column 11 with distance from the rear end thereof toward the front of the vehicle body, as shown in FIG. 6. More specifically, the side wall 6a is inclined to the steering column 11 in a manner such that when the support bracket 5 is located in normal position, a gap δ is secured between the rear end 6d of the side wall 6a and the side surface 25h of the horizontal portion 25a of the bracket 25 and that when the support bracket 5 is moved toward the front of the vehicle body as indicated by the two-dot chain lines, the front end 6c of the side wall 6a comes into close contact with the side surface 25h of the bracket 25, leaving no space therebetween. The gap δ is approximately equivalent to the tolerance of the steering column 11 and support bracket 5.

When the support bracket 5 is detached from the fixing bracket 3 at the time of collision and moves toward the front of the vehicle body together with the steering column 11 and the steering shaft 12, the guide plate 6 serves as a guide for the side surface 25h of the horizontal portion 25a of the support bracket 5. Also, if the steering column 11 and thus the steering shaft 12 are pushed in a direction outward of the vehicle body by the occupant's knee, the guide plate 6 serves to restrict the swaying motion of the members 11 and 12 to fall within a fixed angle. Thus, the guide plate 6 makes it possible to more securely guide the steering shaft 12.

The following describes the operation of the steering unit support device.

FIGS. 1 to 3 show a normal state of the steering unit 1. In this state, the tilt mechanism 8 permits the height of the steering column 11 and thus of the steering shaft 12 to be set to the driver's desired height. Also, the spacers 23 prevent the steering column 11 from shaking laterally and provide the steering shaft 12 with sufficient lateral stiffness. Moreover, as shown in FIGS. 3 and 6, the side surface 25h of the horizontal portion 25a of the bracket 25 of the support bracket 5 faces the side wall 6a of the guide plate 6 with the gap δ therebetween.

Let it be assumed that the vehicle collides head-on against another vehicle or some other object. In such a case, impact load (external force) is input from the driver to the steering shaft 12 and the steering column 11 via the steering wheel (not shown) in the direction indicated by the arrow A. Consequently, the steering shaft 12 and the steering column 11 are pushed toward the front of the vehicle body by the impact load, and the pins 29 connecting the horizontal portions 25a of the support bracket 5 and the capsules 28 are applied with the remainder of the impact load and thus are broken.

As shown in FIG. 7, the steering column 11 is supported by the support bracket 4 through the rivets 24 situated at the front ends of the respective slits 21a of the right and left brackets 21. Accordingly, when pushed toward the front of the vehicle body, the steering column 11 moves toward the front of the vehicle body relative to the rivets 24, that is, the support bracket 4. As the steering column 11 moves toward the front of the vehicle body, the spacers 23 are pushed forward and come out from between the support bracket 4 and the respective brackets 21, which serve as the lateral direction controlling member for the steering column 11, thus creating a gap between the support bracket 4 and each of the brackets 21. The gaps allow the steering column 11 to laterally sway over a given angle.

If, at the time of collision, the steering column 11 and thus the steering shaft 12 are pushed in a direction outward of the vehicle body, as indicated by the arrow B in FIG. 3, by the driver's knee located on the inner side of the vehicle body, the steering column 11 laterally sways. At this time, the side surface 25h of the horizontal portion 25a of the bracket 25 is pressed against and stopped by the side wall 6a of the guide plate 6, whereby the lateral sway of the steering column 11 and thus of the steering shaft 12 due to the lateral load applied by the driver's knee at the time of collision can be suppressed. In this case, the inclined side wall 6a restricts the lateral sway to fall within the fixed angle.

The support bracket 5 moves forward with the side surface 25h of the horizontal portion 25a of the bracket 25 guided along the side wall 6a of the guide plate 6, to a position (front end position) near the support bracket 4, indicated by the two-dot chain lines in FIG. 6. Because of the detachment of the spacers 23, a gap is secured between the support bracket 4 and each of the right and left brackets 21 serving as the lateral direction controlling member for the steering column 11, as stated above, and accordingly, the steering column 11 is prevented from being locked by the support bracket 4 when moving toward the front of the vehicle body. Thus, the steering column 11 can be smoothly moved toward the front of the vehicle body without fail, whereby the load applied during the forward movement of the steering column 11 and the steering shaft 12 can be stabilized.

Also, as the steering column 11 moves toward the front of the vehicle body, the bracket 22 (FIG. 2), which is attached to the lower surface of the steering column 11 and of which the height increases with distance from the front end toward the rear end, is gradually crushed and deformed by the protuberance 4e (FIG. 7) of the support bracket 4. Part of the aforementioned impact load (energy) is absorbed by the deformation.

In the foregoing embodiment, the steering column 11 and the steering shaft 12 are mounted on the vehicle body in such a manner that the front portion of the steering column is located on the inner side of the vehicle body and that the angle θ is formed between the center line O and the line P parallel to the longitudinal axis of the vehicle body. The direction of inclination of the steering column 11 and steering shaft 12 is, however, not limited to that direction. Namely, the steering column 11 and the steering shaft 12 may alternatively be mounted on the vehicle body in such a manner that the front portion of the steering column is located on the outer side of the vehicle body and that the angle θ is formed between the center line O and the line P parallel to the longitudinal axis of the vehicle body. In this case, the guide plate 6 is attached to that side surface of the fixing bracket 3 toward which the rear portion of the steering column 11 is inclined, that is, to the side surface located on the inner side of the vehicle body.

Also, in the above embodiment, the detachable mechanism 7 is constituted by the notches 25c formed in the horizontal portions 25a, the capsules 28 and the pins 29, but the construction of the detachable mechanism is not limited to the one explained above. For example, the bolts 30 connecting the respective capsules 28 to the fixing bracket 3 may be adapted to be broken at the time of collision, to allow the support bracket 5 to be detached from the fixing bracket 3 and thereby permit the support bracket 5 to move toward the front of the vehicle body.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A steering unit support device for a vehicle, comprising:
   a fixing bracket fixed to a cross member of a vehicle body;
   a steering column inclined, in a lateral direction of the vehicle body, with respect to a longitudinal axis of the vehicle body as the steering column extends in a longitudinal direction of the vehicle body;
   a steering shaft rotatably supported by the steering column and connected to a steering wheel of the vehicle;
   a rear support bracket supporting the steering column and attached to the fixing bracket;
   a guide plate attached to the fixing bracket, the guide plate having a side surface, extending along a longitudinal direction of the vehicle, and spaced apart from the rear support bracket prior to an external force acting on the rear support bracket, and the side surface restricting movement of the rear support bracket in the width direction of the vehicle body by making contact with the rear support bracket when the rear support bracket moves due to the external force acting thereon;
   a front support bracket located more forward than the rear support bracket and fixed to the fixing bracket for supporting a front portion of the steering column, such that the steering column is movable toward a front of the vehicle body, the front support bracket having a side wall located on a lateral side of the steering column; and
   a spacer disposed between the steering column and the side wall of the front support bracket located on the lateral side of the steering column, the spacer being arranged to be removed from between the side wall and the steering column when the rear support bracket is detached from the fixing bracket, to create a gap between the steering column and the side wall of the front support bracket located on the lateral side of the steering column.

2. The steering unit support device according to claim 1, wherein the guide plate is so arranged as to approach the steering column as a distance from a rear end thereof increases toward a front of the vehicle body.

3. The steering unit support device according to claim 1, wherein the rear support bracket has a detachable mechanism permitting the rear support bracket to be detached from the fixing bracket.

4. The steering unit support device according to claim 3, wherein the detachable mechanism includes a slit formed in the rear support bracket and opening rearward, a capsule relatively movably engaged with the slit and fixed to the fixing bracket, and a pin connecting the rear support bracket and the capsule to each other, the pin being adapted to be broken when the rear support bracket moves toward the front of the vehicle body.

5. The steering unit support device according to claim 3, wherein a ridge is formed integrally with a portion of the steering column near a front end thereof and protruding toward the front support bracket.

6. The steering unit support device according to claim 1, wherein the spacer has a flat portion interposed between the steering column and the front support bracket, and an engaging portion integral with the flat portion and engaged with the steering column.

7. The steering unit support device according to claim 6, wherein the engaging portion of the spacer is bent at a front end of the flat portion toward the steering column.

8. The steering unit support device according to claim 1, wherein the steering shaft has an impact absorption mechanism for absorbing impact produced at time of a collision of the vehicle.

9. The steering unit support device according to claim 8, wherein the impact absorption mechanism absorbs the impact by producing a sliding load between the steering column and the front support bracket as the steering column moves forward at the time of the collision.

10. The steering unit support device according to claim 9, wherein the impact absorption mechanism includes a bracket attached to a lower surface of the steering column and a protuberance protruding from the front support bracket and facing the bracket, the sliding load being produced by sliding contact between the bracket attached to the lower surface of the steering column and the protuberance.

11. A steering unit support device for a vehicle, comprising:
    a fixing bracket fixed to a cross member of a body of the vehicle;
    a steering column inclined, in a lateral direction of the vehicle body, with respect to a longitudinal axis of the vehicle body as the steering column extends in a longitudinal direction of the vehicle body;
    a steering shaft rotatably supported by the steering column and securely fitted with a steering wheel;
    a support bracket supporting the steering column and attached to the fixing bracket; and
    a guide plate attached to one side portion of the fixing bracket on an outer side of the vehicle body, the guide plate having a side surface extending along the longitudinal direction of the vehicle, the side surface being spaced apart from the support bracket prior to an external force acting on the support bracket, and the side surface restricting movement of the support bracket in the lateral direction of the vehicle body by simultaneously making contact with the support bracket when the support bracket moves due to the external force acting thereon.

* * * * *